Sept. 15, 1970   D. L. DENNER   3,528,573
VEHICLE CARGO ELEVATOR AND STORING ARRANGEMENT THEREFOR
Filed Sept. 16, 1968   3 Sheets-Sheet 1

FIG. I

INVENTOR.
DAVID L. DENNER
BY
Woodhams, Blanchard & Flynn
ATTORNEYS

INVENTOR.
DAVID L. DENNER

Sept. 15, 1970  D. L. DENNER  3,528,573
VEHICLE CARGO ELEVATOR AND STORING ARRANGEMENT THEREFOR
Filed Sept. 16, 1968  3 Sheets-Sheet 3

INVENTOR.
DAVID L. DENNER
BY
Woodhams, Blanchard & Flynn
ATTORNEYS

United States Patent Office 3,528,573
Patented Sept. 15, 1970

3,528,573
VEHICLE CARGO ELEVATOR AND STORING ARRANGEMENT THEREFOR
David L. Denner, Toledo, Ohio, assignor to Overhead Door Corporation, Dallas, Tex., a corporation of Indiana
Filed Sept. 16, 1968, Ser. No. 759,909
Int. Cl. B60p 1/44
U.S. Cl. 214—77                    9 Claims

ABSTRACT OF THE DISCLOSURE

This disclosure pertains to what is commonly referred to as vehicle lift gates or vehicle cargo elevators. More particularly, the disclosure pertains to a platform adapted to be mounted either to the rear or the side of a vehicle (such as a truck) by two sets of parallel arm linkage systems. The parallel arm linkage systems pivot through a vertical arc upon actuation of power cylinders to move the platform or elevator from the ground engaging position to a position adjacent the cargo bed. To permit storage of the elevator and its linkage systems during traveling, the device may be conveniently and compactly folded beneath the side or the rear of the vehicle.

BACKGROUND OF THE INVENTION

Field of the invention

The field of the invention is that of cargo elevators or lift gates adapted to lift cargo from the ground to the vehicle bed while maintaining the lifting platform or elevator in a horizontal position.

Description of the prior art

Many prior art devices exist for lifting and loading cargo from the ground to the vehicle bed. Many of these prior art devices have provided a linkage system which permits the lifting platform to be pivoted vertically to close the end of the vehicle or to fold the platform upon the parallel linkage arms themselves for storage. The latter type are many and varied. They include parallel arm linkage systems having either a pivot in the tension arm or a pivot in the compression arms to permit the platform to be folded back upon the parallel arm linkage systems or underneath the same. Likewise, the pivoted connections between the parallel arm linkage systems and the platform have been such to permit the platform to pivot with respect to the parallel arm linkage systems or either the tension arms or the compression arms have been permitted to telescope (or provided with lost motion), to accommodate pivoting of the platform to a stored position.

SUMMARY OF THE INVENTION

This invention relates to vehicle elevators and more particularly to ones having parallel linkage systems connecting the platform to the vehicle and permitting the same to be elevated and lowered while in a position parallel to the ground. These parallel linkage systems are constructed to allow both the tension and the compression arms to be pivoted between the ends thereof whereby each may be folded upon itself (and the cargo platform may be folded upon itself) to permit storage of the platform and the parallel linkage mechanism beneath the rear or the side of the cargo bed without obtrusive projection.

Furthermore, this invention contemplates the provision of means connecting the tension arm and the compression arm, or more particularly, connecting the pivot points in the tension and compression arms in order to facilitate folding by preserving the parallelogrammatic relationship of the arms during the pivoting operation necessary for storage.

PREFERRED EMBODIMENT OF THE INVENTION

Figure 1:
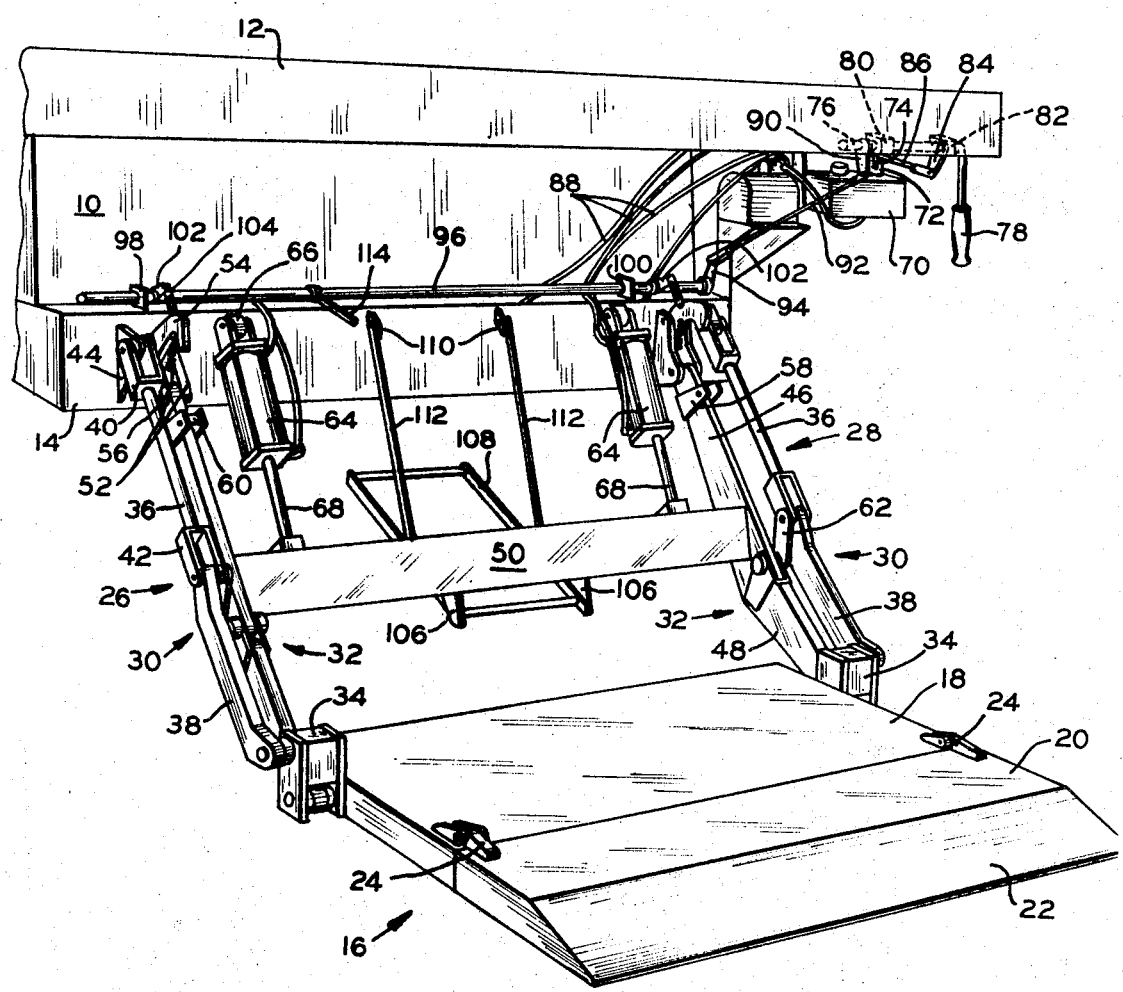
FIG. 1 is a perspective view of the cargo elevator in its lowered ground engaging position particularly disclosing the parallel arm linkage system.

Referring now in detail to the drawings and in particular to FIG. 1, the side (or alternatively the rear) portion of the frame of a motor vehicle is illustrated generally at 10. The vehicle frame and a cargo bed 12 which is seated on the frame vary from vehicle to vehicle and the details of these form no part of this invention. Means is provided for mounting the cargo elevator to the frame 10 of the vehicle. More particularly, the mounting means takes the form of an elongated box shaped member 14 suitably secured to the frame 10 such as by welding.

Figure 2:
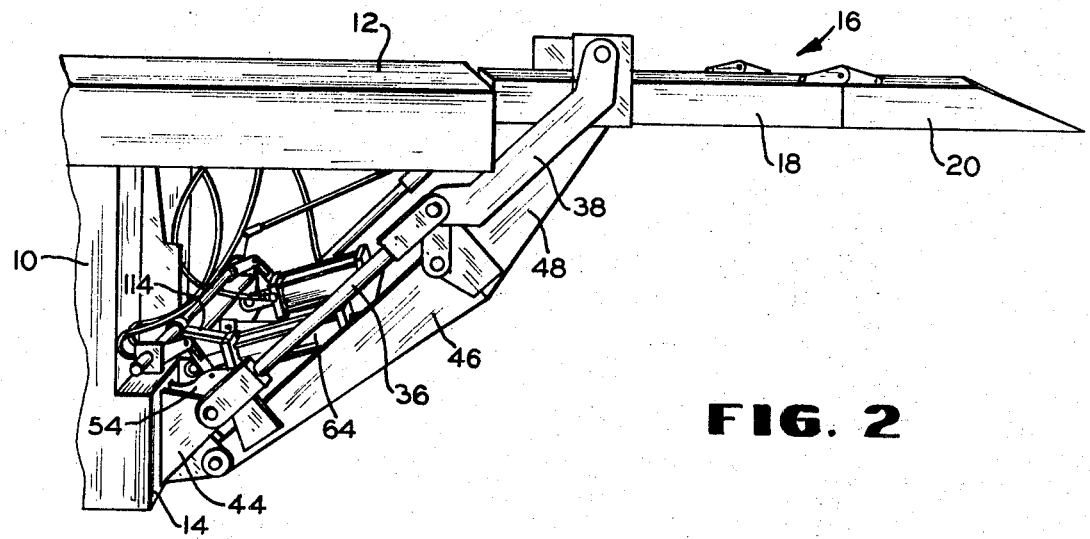
FIG. 2 is a perspective view from the side of the cargo elevator showing the elevator in a horizontal position adjacent the vehicle bed.

A cargo platform 16 is provided for receiving cargo in its ground engaging lowered position as shown in FIG. 1 and for lifting the cargo to the position shown in FIG. 2 wherein it may be moved on to the vehicle cargo bed 12. The cargo platform 16 consists of two sections. The rear section 18 is of general rectangular shape with a thickness sufficient to withstand heavy loading. The front section 20 of the platform is also rectangularly shaped but is provided with a beveled forward portion 22 to more easily accommodate wheeled carts which may be pushed up the beveled incline onto the platform. The rear section 18 and the front section 20 of the platform are pivotally secured together by a pair of hinges 24 positioned adjacent the sides of the platform whereby the front section 20 may be pivoted so that it lies upon the rear section 18 when desired for storage purposes.

A pair of parallel arm linkage systems 26 and 28 are pivotally secured at their outer ends to the platform 16 and have their inner ends pivotally attached to the mounting means 14 and thus serve as the means for lifting and lowering the platform. The parallel linkage systems 26 and 28 are identical in construction and each comprises a tension arm 30 and a compression arm 32. The tension arms 30 and the compression arms 32 are spaced laterally beside the platform 16 and are pivotally mounted with respect thereto by a box like securing structure 34 which is welded to the sides of the platform.

Each tension arm 30 is comprised of an inner section 36 and an outer section 38 pivotally secured together. The inner section 36 of tension arms 30 is a rod-like member having clevices 40 and 42 threadedly secured to the ends thereof. The open end of clevice 40 receives a portion of an anchor member 44 attached to and extending outwardly from the mounting means 14. A pin extends through the arms of the clevice and through the anchor member to provide a pivoted connection. The clevice 42 receives an end of the outer section 38 between the arms thereof and a pin extends through the arms of the clvice and the end of the outer section 38 to pivotally secure the two together. The other end of the outer section 38 has a pin extending therethrough and into the upper portion of the box-like securing structure 34 attached to the platform 16 to pivotally secure the tension arms to the platform.

Each compression arm 32, likewise, consists of an inner section 46 and an outer section 48. The end of outer section 48 is accommodated by the lower portion of the box like securing structure 34 and a pin extends through the securing structure and the outer section 48 to pivotally secure the same to the platform 16. The other end of outer section 48 terminates in a U-shaped portion having considerable depth. The inner section 46 of the compression arm is positioned between the arms of the U-shaped portion of the outer section 48 and a pin extends through the various portions adjacent the upper part thereof. Accordingly, the inner and outer sections 46 and 48 may pivot in one direction with respect to each other but their lower portions abut against each other to prohibit relative pivotal movement in the opposite direction. A cross member 50 extends between the compression arms 32 of each parallel linkage system 26 and 28 and is welded to the inner section 46 of the compression arms to reinforce the same and provide a rigid structure.

The other ends of the innr sections 46 of the compression arms are positioned between a pair of spaced downwardly extending anchor members 52 which are secured to the mounting means 14. A pin extends through the anchor members 52 and the end of the inner section 46 of the compression arms to pivotally secure the same with respect to the mounting means. As illustrated in FIG. 2, the three pivot pins of the tension arm and the three pivot pins of the compression arm are substantially aligned in two substantially parallel rows when the tension and compression arms are in the unfolded condition.

Adjacent the upper portion of the downwardly extending anchor members 52, is a hook-like latch member 54 which is pivotally mounted to the anchor members 52 by a pin extending therethrough. Each hook-like latch member 54 is biased in a clockwise direction as viewed in FIG. 1 by a coil spring 56 attached to the latch member and the anchor members. To cooperate with the hook-like latch member when the cargo elevator or platform 16 is in its raised position, a pair of ears 58 extend upwardly from and are secured to the inner section 46 of the compression arms and mount a latch pin 60.

Means is provided to insure that a parallelogrammatic relationship is maintained between the tension arms 30 and the compression arms 32. More particularly, a link member 62 has one end thereof pivotally secured to the pivot connection between the inner and outer sections of the tension arm and the other end thereof pivotally secured to the pivot connection between the inner and outer sections of the compression arm. Such pivoted connections are accomplished by extending the pins which pivotally connect the portions of the tension and compression arms so that the pins also extend through the link members 62.

Figure 3:
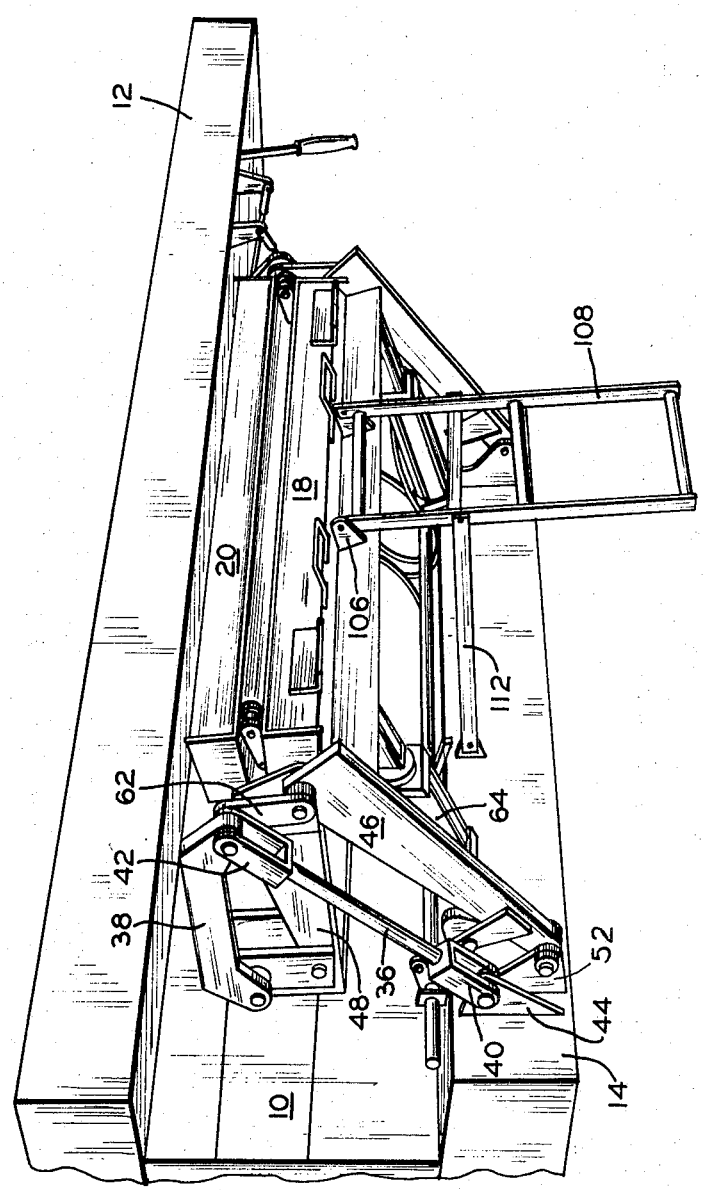
FIG. 3 is a perspective view illustrating both the tension and compression arms folded upon themselves (as well as the platform being folded upon itself) and raised to its stored, traveling position beneath the vehicle bed.

To provide means for moving the cargo elevator from the grounded lowered position as shown in FIG. 1 to the raised position as shown in FIG. 2 as well as the carriage position as shown in FIG. 3, a pair of power cylinders 64 are provided. The inner ends of the power cylinders 64 are provided with ears which receive an anchor 66 extending from the mounting means 14 and are pivoted thereto by means of a pin extending through the ears and the anchor. A piston rod 68 extends from the other end of the power cylinder 64 and has one end attached to a piston (not shown) which reciprocates within the power cylinder and the other end pivotally secured to the cross member 50 extending between the inner sections of the compression arms.

Means is provided for controlling the flow of fluid to and from the power cylinder 64. More particularly, fluid under pressure is supplied to the power cylinders 64 from a fluid pump 70 which is actuated by an electric switch 72. Switch 72 is opened and closed by means of a switch handle 74. A manual control rod 76 having a handle 78 thereon is mounted to vehicle frame 10 by means of guide brackets 80 and 82. Control rod 76 carries intermediate its ends a lever 84 which is connected to switch handle 74 by means of a link 86 whereby rotation of the handle 74 to rotate control rod 76 about its axis actuates hydraulic motor switch 72. Hydraulic motor switch 72 is a conventional hydraulic motor switch having three control operations: First, it may actuate the motor to pump fluid into cylinders 64; second, it may close the valves and hydraulic motor 70 to prevent fluid flow to and from cylinders 64; and third, it may open valves and hydraulic motor 70 permitting venting of all fluid in cylinders 64. Appropriate hosing 88 is provided to carry and evacuate fluid between the fluid motor 70 and the power cylinders 64.

On the remote end of the control rod 76 is a lever 90 which is adapted to rotate when the control rod 76 is pivoted about its axis. A link 92 is pivotally connected to the lever 90 at one end and to a lever 94 which is mounted for rotation with a second control rod 96 positioned above the mounting means 14 and pivotally secured with respect thereto by brackets 98 and 100. A pair of levers 102 are spaced adjacent the ends of the second control rod 96 and extend upwardly therefrom, A link 104 is pivotally connected to each lever 102 and also to the hook-like latch member 54. Accordingly, when the second control rod 96 is rotated the levers 102 rotate therewith and pivot the hook-like latch members in a counterclockwise direction to release the latch pin 60 provided on the compression arms.

While the power cylinder actuating control mechanism is shown as positioned adjacent one side of the parallel linkage mechanism, it is readily apparent that such control mechanism can alternatively be positioned on the other side of the parallel linkage system or, if so desired, duplicate control rods may be provided.

Ladder means is provided to facilitate access to the vehicle cargo bed 12 when the cargo elevator is in its stored position as shown in FIG. 1. More particularly, a pair of spaced anchors 106 extend from the cross member 50 and are pivotally connected to the upper portion of a two step ladder 108. A second pair of spaced anchor members 110 are provided on the mounting means 14 substantially midway between the parallel linkage systems 26 and 28. A pair of struts 112 are pivotally secured to the anchor members 110 at one end and are pivotally secured to the ladder 108 slightly above the midsection of the ladder. The struts 112 are of a length such that when the cargo elevator is in its stored position as shown in FIG. 3 the ladder 108 extends in substantially a vertical position. However, when the cargo elevator is moved to its lower position as shown in FIG. 1, the ladder is pivoted to a position underneath the vehicle.

OPERATION

In operation, the vehicle is driven with the cargo elevator or lift platform in its stored position as shown in FIG. 3. When the vehicle has reached the desired destination, the cargo elevator is lowered by the operator manually rotating control handle 78 in a clockwise direction. This rotation of the control rod 76 does two things. First, it pivots lever 90 to move link 92 and lever 94 to cause rotation of the second control rod 96. This rotation of the second control rod 96 through levers 102 and links 104 causes pivotal movement of the hook like latch members 54 to release the latch pins 60.

Second, rotation of the control rod 76 pivots lever 84 and through link 86 and switch handle 74 actuates the electric switch 72 to cause the fluid pump 70 to evacuate power fluid from the outer ends of the cylinders 64. Thus, the piston rods 68 start to move out from the power cylinders 64 permitting the cargo elevator and the linkage mechanism to move to the position shown in FIG. 4. Further downward pivotal movement of the cargo elevator causes the rear section 18 of the platform to engage an elongated control lever 114 extending outwardly from the second control rod 96. This engagement causes rotation of the second control rod and through lever 94, link 92 and lever 90 rotates the first control rod 76 to return the control handle to its original position stopping the flow of fluid to fluid motor 70. At this partially lowered position, the operator then manually pivots the outer sections 38 and 48 of the tension and compression arms respectively with respect to their inner sections. The control lever 114 is appropriately positioned on the second control rod so that when it is engaged to stop the lowering of the cargo elevator, the outer portion of the elevator may be pivoted without engaging the under surface of the cargo bed 12.

After the tension and compression arms 30 and 32 have been pivoted to their unfolded position, the front section 20 of the platform 16 may be pivoted with respect to the rear section 18 to place the platform also in its unfolded position. The operator then again pivots the control handle 78 in clockwise direction to effect continued downward movement of the platform until it reaches the position shown in FIG. 1.

A wheeled cart or similar type cargo is then rolled up the beveled forward portion of the platform on to the platform. The operator then pivots control handle 78 in the counterclockwise direction to actuate electric switch 72 causing the fluid motor 70 to supply fluid to the outer ends of the power cylinders 64. This causes piston rod 68 to telescope within the power cylinders and thus pivot the parallel linkage systems 26 and 28 with respect to their connection with the mounting means 14 until the cargo elevator is in the position shown in FIG. 2. From this position, the cargo may then be moved on to the vehicle bed.

Figure 4:
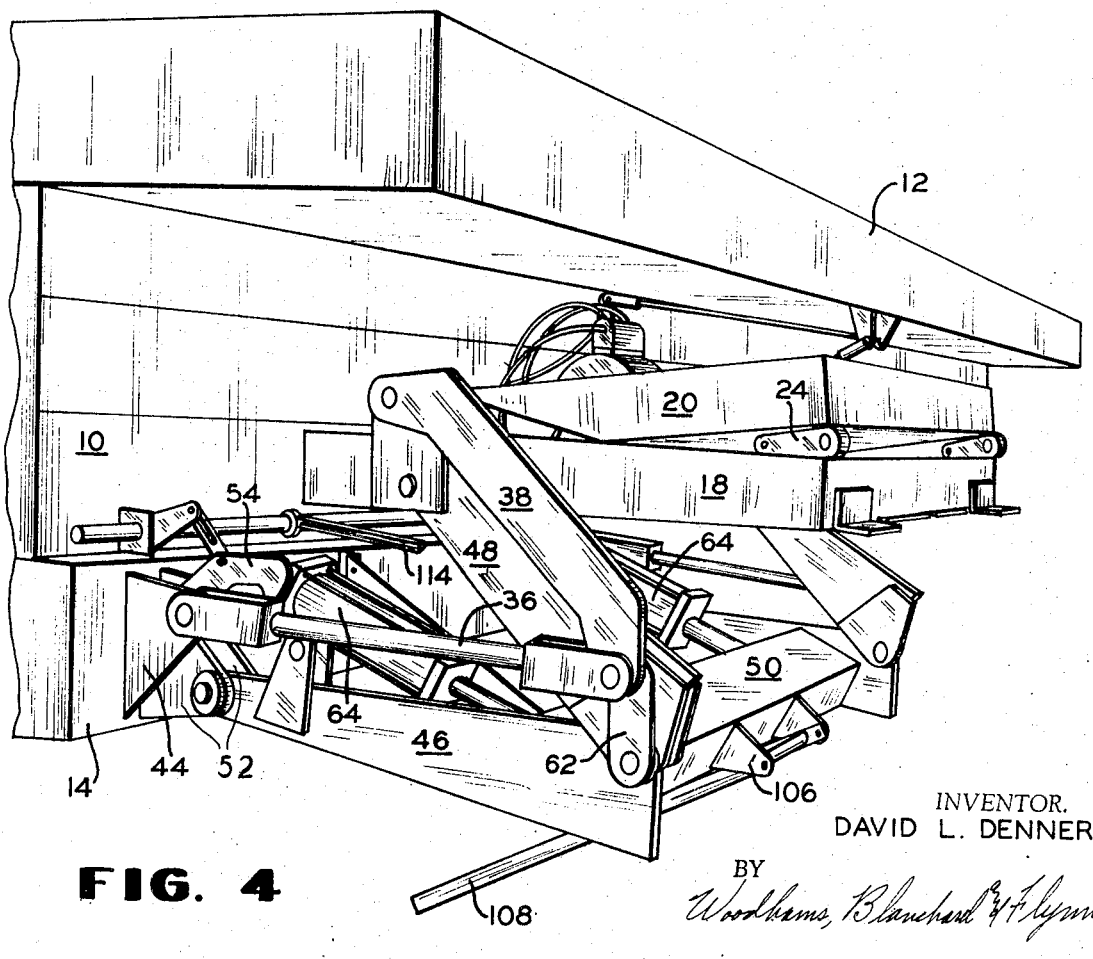
FIG. 4 is a perspective view of the platform and linkage in its folded position similar to FIG. 3 but with the device partially lowered.

To return the cargo elevator to its stored, carrying position, the control handle 78 is again pivoted in the clockwise direction causing lowering of the platform to its partially lowered position. Then, the front section 20 of the platform 16 is folded upon the rear section 18. Next, the outer section 38 and 48 of the tension and compression arms are folded about their pivots with the inner sections so that the outer sections are folded upon the inner sections. The links 62 connecting the pivots between the inner and outer sections of the tension and compression arms insure that the linkage systems are maintained in their proper relationship. Then, the control handle 78 is pivoted in the counterclockwise direction to raise the platform and parallel arm linkage systems 26 and 28 from their partially lowered position as shown in FIG. 4 to the stored, carriage position as shown in FIG. 3. During this upward pivotal movement, the latch pins 60 come into engagement with hook-like latch members 54 which then firmly, securely hold the platform in its raised stored position even in the event of a fluid power failure.

From the foregoing it is apparent that a vehicle cargo elevator has been provided which will not only quickly and conveniently lift cargo from the ground to the vehicle bed but will also permit folding of the platform and its linkage system to one of the neatest, compact storing packages yet devised.

The control lever 114 and its function have been described briefly above to permit a more complete description of the operation of the present invention. However, the vehicle lift gate according to the present invention could obviously be utilized without incorporating therein the control lever 114. For example, the lift gate could be manually stopped at an intermediate position to permit folding and unfolding of the two sections 18 and 20 of the lift gate platform. The control lever 14 and its structural and operational relationships are described in greater detail in copending application Ser. No. 795,418, filed Jan. 31, 1969, which application is the joint invention of David L. Denner and Donald E. Stoll.

While one embodiment of this invention has been shown and described in detail, it is apparent that there may be many changes in structure and operation without departing from the scope of this invention as defined by the appended claims.

What is claimed is:
1. A vehicle cargo elevator, comprising:
    a cargo platform adapted to lift cargo from the ground to a cargo bed;
    vehicle-mounting means;
    parallel linkage means pivotally connected at one end to said cargo platform and pivotally connected at the other end to said vehicle-mounting means;
    said parallel linkage means comprising at least one tension arm and one compression arm, said tension arm and said compression arm each being pivoted between the ends thereof whereby each arm may be folded upon itself to facilitate storage;
    link means pivotally connected at one end to said tension arm and at the other end to said compression arm, said link means being connected to said tension arm and said compression arm at the pivot points for folding said arms upon themselves; and
    force-generating means connected to the vehicle-mounting means and said parallel linkage means for effecting lifting and lowering of said platform.
2. In a vehicle cargo elevator, the combination comprising:
    a cargo platform adapted to lift cargo from the ground to a cargo bed;
    vehicle-mounting means;
    parallel linkage means pivotally connected at one end to said cargo platform and pivotally connected at the other end to said vehicle mounting means;
    said parallel linkage means including two sets of arms with each of said sets including at least one tension arm and at least one compression arm, said tension arms and said compression arms each being pivoted between the ends thereof whereby each arm may be folded upon itself to facilitate storage, and each set of arms being spaced laterally on one side of the platform with the arms of each set being pivotally connected to the platform and the vehicle-mounting means;
    said sets of tension and compression arms being attached at the rear of the platform to a securing structure extending upwardly from the platform with the tension arm being pivotally attached to the upper portion of the securing structure and the compression arm being pivotally attached to the lower portion of said securing structure; and
    force-generating means connected to the vehicle-mounting means and said parallel linkage means for effecting lifting and lowering of said platform, said force-generating means being connected to at least one of the compression arms intermediate the ends thereof at a point inwardly from the pivot point for folding the arm upon itself.
3. The combination of claim 2 wherein said platform comprises a flat rectangular-shaped rear portion, and a beveled rectangular front portion pivoted thereto for allowing the beveled portion to be folded upon the rear portion, so that when the tension and compression arms are folded upon themselves the platform is conveniently stored.
4. In a vehicle cargo elevator, the combination comprising:
    a cargo platform adapted to lift cargo from the ground to a cargo bed;
    vehicle-mounting means;
    parallel linkage means pivotally connected at one end to said cargo platform and pivotally connected at the other end to said vehicle-mounting means;
    said parallel linkage means including two sets of arms with each of said sets including at least one tension arm and at least one compression arm, said tension arms and said compression arms each being pivoted between the ends thereof whereby each arm may be folded upon itself to facilitate storage, and each set of arms being spaced laterally on one side of the platform with the arms of each set being pivotally connected to the platform and the vehicle-mounting means;

force-generating means connected to the vehicle-mounting means and said parallel linkage means for effecting lifting and lowering of said platform, said force-generating means being connected to at least one of the compression arms intermediate the ends thereof at a point inwardly from the pivot point for folding the arm upon itself;

a cross member extending between and rigidly connecting said compression arms inwardly from said compression arm pivot points;

a ladder pivotally connected to said cross member; and strut means pivotally connected to said vehicle-mounting means and said ladder intermediate the ends thereof and being of a length such that when the platform is in its stored position, the ladder is disposed substantially vertically adjacent the side of the vehicle and when said platform is in its grounded position, the ladder is pivoted inwardly in an unobtrusive position.

5. A cargo elevator for a vehicle having a cargo bed, comprising:

a pair of spaced, parallel-acting linkages adapted to be pivoted adjacent one end thereof to said vehicle for swinging through generally vertical arcs;

a platform extending between and pivotally connected to the other end of said pair of linkages, the platform being movable between a use position and a storage position, the platform when in the use position being swingable by the pair of linkages from a grounded horizontal position below the vehicle to a position adjacent the cargo bed;

each of said pair of linkages including compression arm means and tension arm means, each arm means being pivoted between the ends thereof whereby each arm means may be folded upon itself to permit movement of the platform to the storage position;

said tension arm means including inner and outer tension arm segments, one end of the inner segment being pivotally connected at a first pivot point to the vehicle and one end of the outer segment being pivotally connected at a second pivot point to the platform, the adjacent ends of the inner and outer segments being pivotally connected at a third pivot point, the first, second and third pivot points being aligned in a row when the tension arm means is unfolded and the platform is in the use position;

said compression arm means including inner and outer compression arm segments, one end of the inner segment being pivotally connected at a first pivot point to the vehicle and one end of the outer segment being pivotally connected at a second pivot point to the platform, the adjacent ends of the inner and outer segments being pivotally connected at a third pivot point, the first, second and third pivot points being aligned in a row when the compression arm means is unfolded and the platform is in the use position;

link means pivotally connected between the compression arm means and the tension arm means for maintaining the inner and outer tension arm segments substantially parallel to the inner and outer compression arm segments, respectively; and power means operably connected between the vehicle and the linkages for causing swinging movement of said platform between the grounded horizontal position and the position adjacent the cargo bed when the tension and compression arms are unfolded and the platform is in the use position, said power means permitting upward swinging movement of the platform into said storage position wherein said platform is positioned at least partially under the cargo bed when the tension and compression arm means are in the folded position.

6. A cargo elevator according to claim 5, wherein the first, second and third pivot points of the tension arm means are disposed substantially directly above the first, second and third pivot points of the compression arm means, respectively.

7. A cargo elevator according to claim 6, wherein the platform comprises a flat, rectangular-shaped rear portion and a beveled rectangular-shaped front portion pivotally connected to the rear portion for allowing the front portion to be folded upon the rear portion so that when the tension arm means and compression arm means are folded upon themselves, the platform can be conveniently moved to the storage position substantially underneath the vehicle bed.

8. A cargo elevator according to claim 5, wherein a cross member extends between and rigidly connects the inner arm segments of one of the pair of arm means, and the power means including an extendible and contractable fluid power cylinder having one end anchored relative to the vehicle and the other end connected to the cross member for effecting pivotable movement of the linkages and the platform carried thereby.

9. A cargo elevator according to claim 5, wherein a mounting member is fixedly and stationarily secured to the vehicle, and the inner ends of the tension arm means and compression arm means are pivotally connected to the mounting member.

References Cited

UNITED STATES PATENTS

| | | |
|---|---|---|
| 2,843,277 | 7/1958 | Brannan. |
| 3,035,721 | 5/1962 | McCarty et al. |
| 3,282,451 | 11/1966 | Corley. |
| 3,369,678 | 2/1968 | Robinson. |

FOREIGN PATENTS

| | | |
|---|---|---|
| 1,229,575 | 3/1960 | France. |

ROBERT G. SHERIDAN, Primary Examiner

R. J. SPAR, Assistant Examiner